(12) United States Patent
Yoshikawa et al.

(10) Patent No.: US 8,306,390 B2
(45) Date of Patent: Nov. 6, 2012

(54) SCENE SEGMENT DIVIDING DEVICE

(75) Inventors: Masaaki Yoshikawa, Kanagawa-ken (JP); Toru Nakada, Kanagawa-ken (JP); Wenli Zhang, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 1488 days.

(21) Appl. No.: 11/814,427

(22) PCT Filed: Jan. 17, 2006

(86) PCT No.: PCT/JP2006/300482
§ 371 (c)(1),
(2), (4) Date: Jul. 20, 2007

(87) PCT Pub. No.: WO2006/077806
PCT Pub. Date: Jul. 27, 2006

(65) Prior Publication Data
US 2009/0202217 A1 Aug. 13, 2009

(30) Foreign Application Priority Data
Jan. 24, 2005 (JP) .................. 2005-016094

(51) Int. Cl.
*H04N 9/80* (2006.01)
(52) U.S. Cl. ................ 386/241; 386/223; 386/341
(58) Field of Classification Search .......... 386/223, 386/241, 341
See application file for complete search history.

(56) References Cited

U.S. PATENT DOCUMENTS
5,808,695 A * 9/1998 Rosser et al. .............. 348/584

FOREIGN PATENT DOCUMENTS
JP 11-339009 A 12/1999
JP 2003-32544 A 1/2003
JP 2004-40750 A 2/2004

OTHER PUBLICATIONS

Takuya Nagase and Shinji Ozawa, "The Play Judging of a Player in Soccer", Department of Information and Computer Science, Keio University, 2003. Japan.
Yasushi Nakagawa, "Automation of the Soccer Game Analysis", with English abstract, Unisys Technology Review, Feb. 2003.
International Search Report for PCT/JP2006/300482, dated Apr. 18, 2006.

* cited by examiner

*Primary Examiner* — Jamie Atala
(74) *Attorney, Agent, or Firm* — RatnerPrestia

(57) ABSTRACT

A scene segment dividing device which can precisely specify a break segment and an in play segment based on a sports image and can precisely manage a series of offenses in the in play segment as each scene segment. A scene segment division unit extracts ball track information in an in play segment based on specified break segments to divide the information into scene segments.

8 Claims, 20 Drawing Sheets

BALL TRACK INFORMATION SEARCH FLOW

BALL TRACK INFORMATION SEARCH FLOW

SCENE SEGMENT DIVISION FLOW

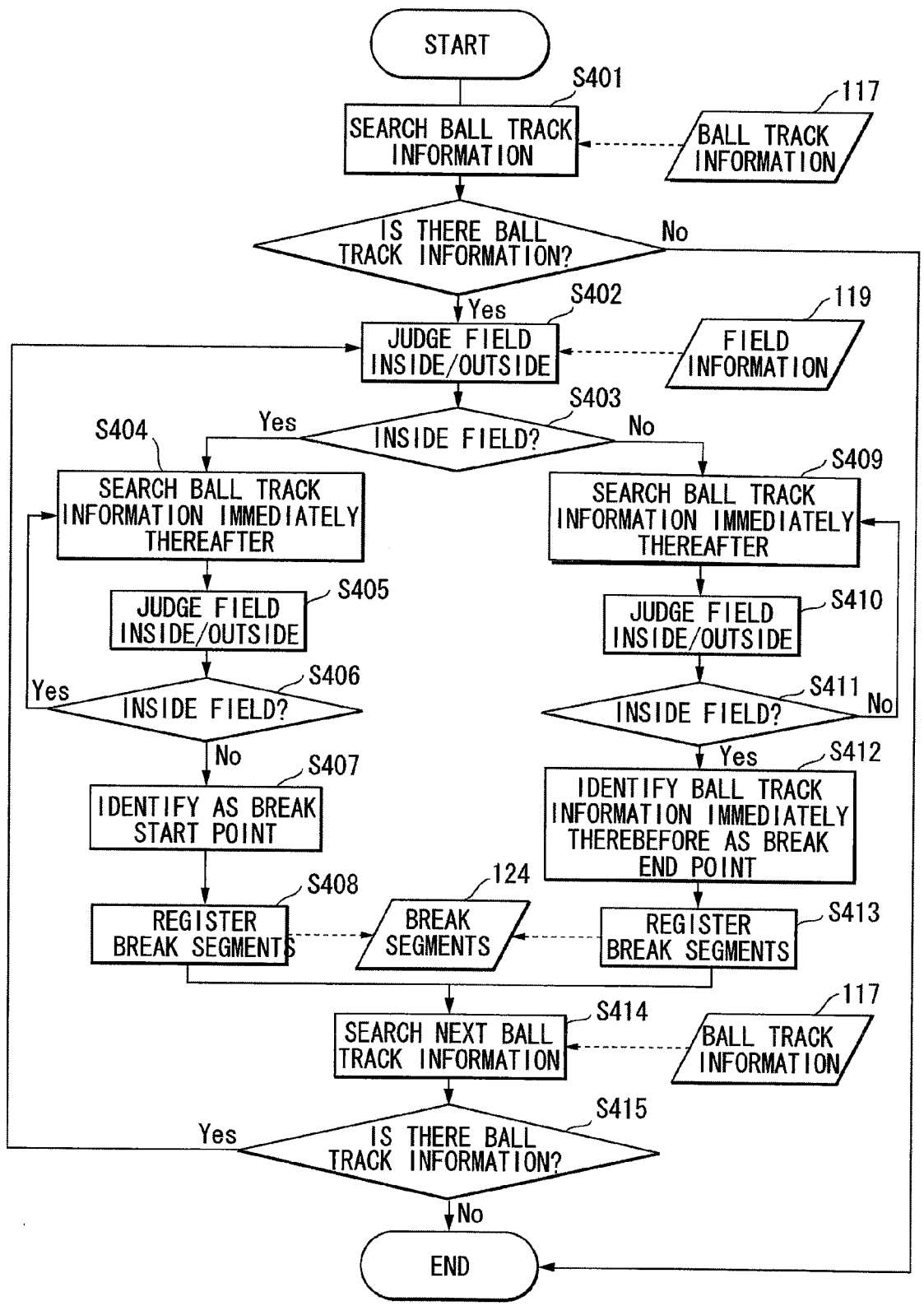
BREAK SEGMENT SPECIFICATION BASED ON BALL POSITION

FIG. 5

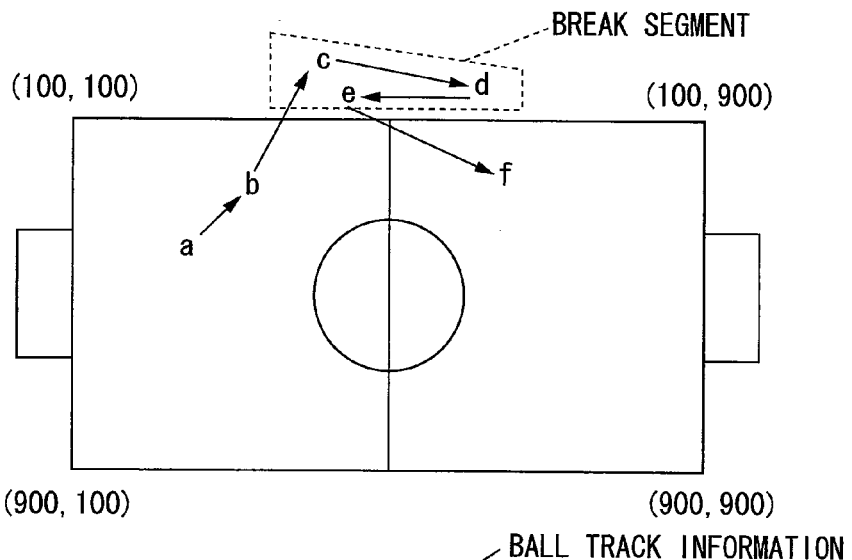

BALL TRACK INFORMATION

| | TRACK CHANGE TIME | BALL POSITION (X, Y) | BALL MOVEMENT VECTOR | SUBJECT (TEAM) |
|---|---|---|---|---|
| a | 00:12:00 | (400, 300) | (-5, 2) | A TEAM |
| b | 00:12:10 | (200, 350) | (-10, 6) | A TEAM |
| c | 00:12:20 | (60, 380) | (2, 16) | A TEAM |
| d | 00:12:30 | (70, 600) | (5, -6) | A TEAM |
| e | 00:12:40 | (60, 380) | (15, 15) | B TEAM |
| f | 00:12:50 | (220, 650) | (5, 6) | B TEAM |

| | POSITION (X, Y) |
|---|---|
| UPPER LEFT CORNER | (100, 100) |
| UPPER RIGHT CORNER | (100, 900) |
| LOWER LEFT CORNER | (900, 100) |
| LOWER RIGHT CORNER | (900, 900) |

← FIELD INFORMATION

BREAK SEGMENT

| | | | | | |
|---|---|---|---|---|---|
| c | 00:12:20 | (60, 380) | (2, 16) | A TEAM | ← BREAK START POINT |
| d | 00:12:30 | (70, 600) | (5, -6) | A TEAM | |
| e | 00:12:40 | (60, 380) | (15, 15) | B TEAM | ← BREAK END POINT |

ASSOCIATE WITH THROW-IN

| f | 00:12:50 | (220, 650) | (5, 6) | B TEAM | THROW-IN |
|---|---|---|---|---|---|

UPDATE REGISTER INTO BALL TRACK INFORMATION STORAGE UNIT (117)

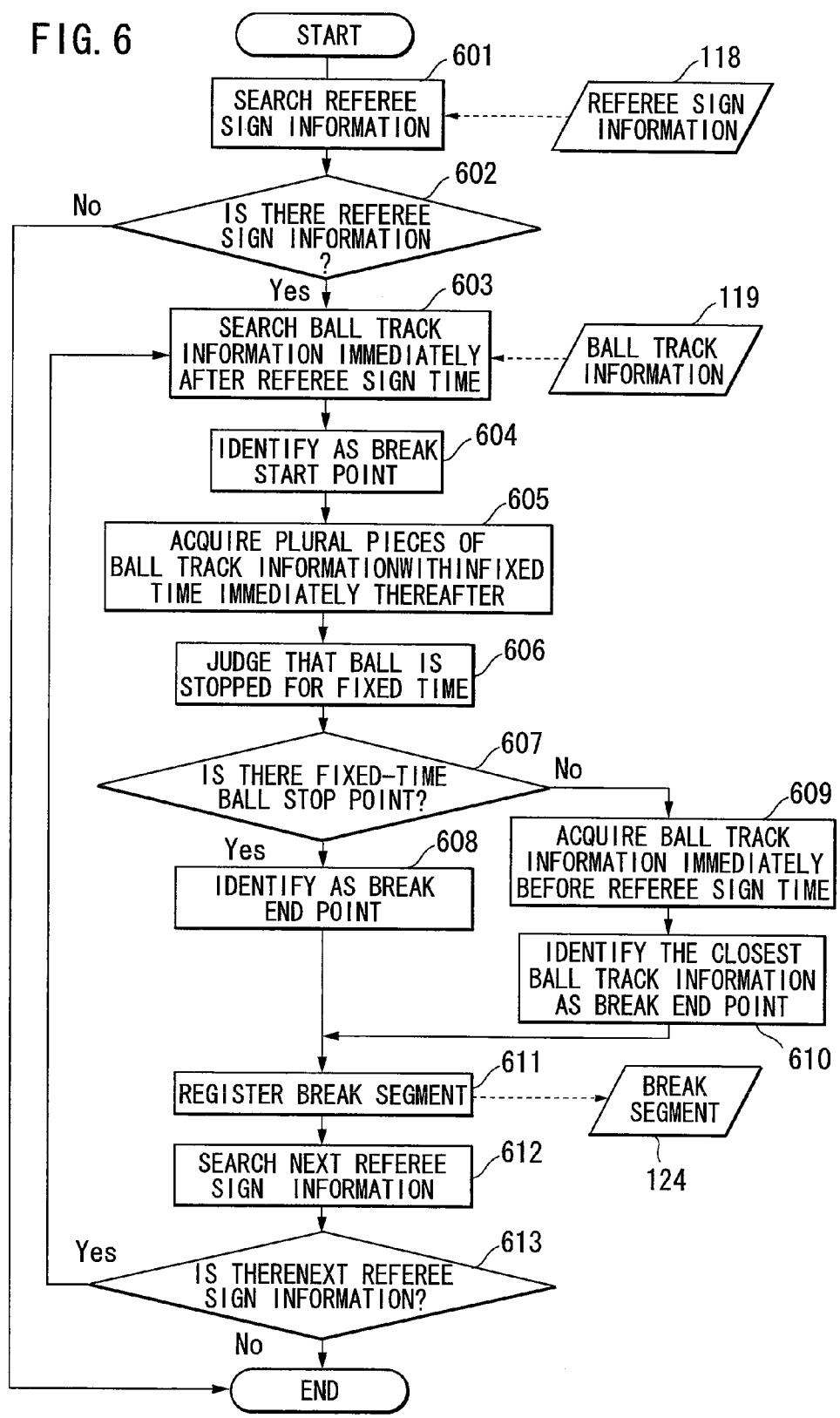

FIG. 7

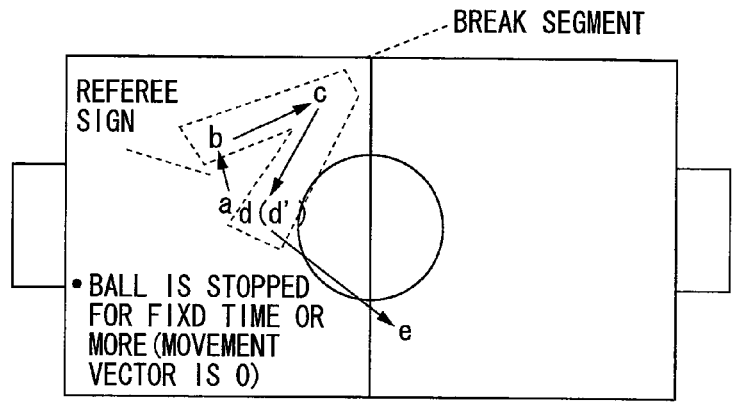

- THERE IS REFEREE SIGN BETWEEN POINTS a AND b
- THERE IS FOUL AT POINT a (DEFINED) (BREAK SEGMENT FROM POINT b)
- BALL IS STOPPED AT d FOR FIXED TIME OR MORE (MOVEMENT VECTOR IS 0)
- d IS CLOSEST POSITION TO a

BALL TRACK INFORMATION

|   | TRACK CHANGE TIME | BALL POSITION (X, Y) | BALL MOVEMENT VECTOR | SUBJECT (TEAM) |
|---|---|---|---|---|
| a | 00:12:00 | (500, 300) | (-6, 2) | A TEAM |
| b | 00:12:10 | (350, 350) | (-4, 10) | A TEAM |
| c | 00:12:20 | (330, 480) | (10, -4) | A TEAM |
| d | 00:12:30 | (520, 320) | (0, 0) | A TEAM |
| d' | 00:12:50 | (520, 320) | (11, 10) | A TEAM |
| e | 00:13:00 | (800, 560) | (2, 15) | B TEAM |

REFEREE SIGN INFORMATION

|   | SIGN TIME |
|---|---|
| X | 00:12:05 |

BALL TRACK INFORMATION

|   |   |   |   |   |
|---|---|---|---|---|
| b | 00:12:10 | (350, 350) | (-4, 10) | A TEAM |
| c | 00:12:20 | (330, 480) | (10, -4) | A TEAM |
| d | 00:12:30 | (520, 320) | (0, 0) | A TEAM |

BREAK START POINT
BREAK END POINT

ASSOCIATE WITH FREE KICK

| d' | 00:12:50 | (520, 320) | (11, 10) | A TEAM | FREE KICK |

UPDATE REGISTER INTO BALL TRACK INFORMATION STORAGE UNIT (117)

BREAK SEGMENT SPECIFICATION BASED ON BALL MOVEMENT VECTOR

FIG. 9

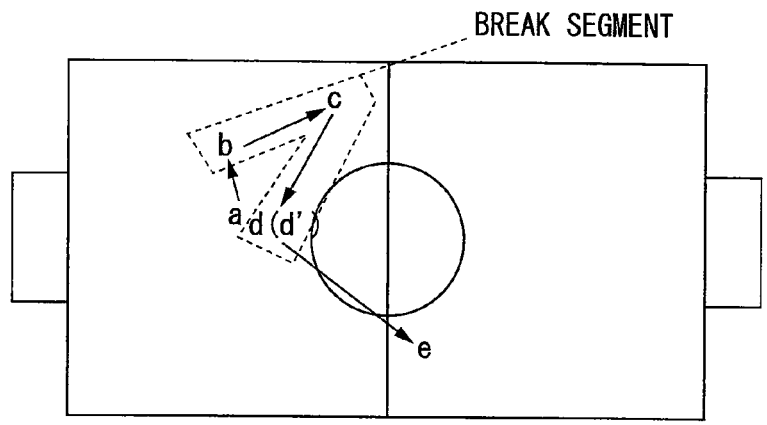

- THERE IS FOUL NEAR POINT a (PREDICTED) (BREAK SEGMENT FROM POINT a)
- BALL IS STOPPED FOR FIXED TIME OR MORE (MOVEMENT VECTOR IS 0)
- a IS CLOSEST POSITION TO d

BALL TRACK INFORMATION

|  | TRACK CHANGE TIME | BALL POSITION (X, Y) | BALL MOVEMENT VECTOR | SUBJECT (TEAM) |
|---|---|---|---|---|
| a | 00:12:00 | (500, 300) | (-6, 2) | A TEAM |
| b | 00:12:10 | (350, 350) | (-4, 10) | A TEAM |
| c | 00:12:20 | (330, 480) | (10, -4) | A TEAM |
| d | 00:12:30 | (520, 320) | (0, 0) | A TEAM |
| d' | 00:12:50 | (520, 320) | (11, 10) | A TEAM |
| e | 00:13:00 | (800, 560) | (2, 15) | B TEAM |

BREAK SEGMENT / BREAK START POINT

| b | 00:12:10 | (350, 350) | (-4, 10) | A TEAM |
|---|---|---|---|---|
| c | 00:12:20 | (330, 480) | (10, -4) | A TEAM |
| d | 00:12:30 | (520, 320) | (0, 0) | A TEAM |

BREAK END POINT

ASSOCIATE WITH FREE KICK

| d' | 00:12:50 | (520, 320) | (11, 10) | A TEAM | FREE KICK |
|---|---|---|---|---|---|

UPDATE REGISTER INTO BALL TRACK INFORMATION STORAGE UNIT (117)

FIG. 11

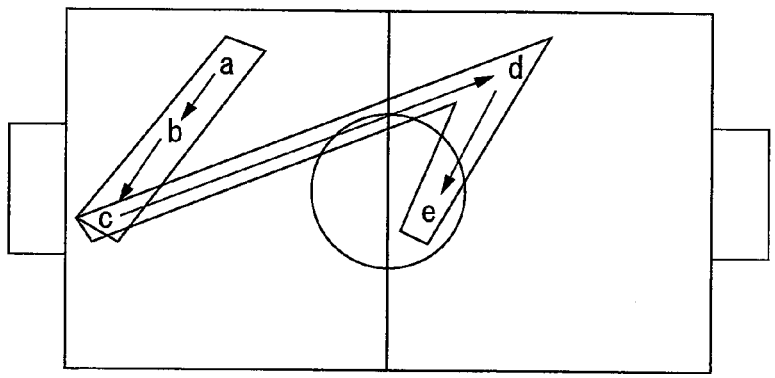

- SCENE DIVISION IS PERFORMED WHEN SUBJECT TEAMS OF BALL TRACK INFORMATION c AND BALL TRACK INFORMATION d IMMEDIATERY THEREAFTER ARE DIFFERENT, DIFFERENCE IN TIME IS SMALL AND DIFFERENCE IN POSITION IS LARGE BALL TRACK INFORMATION AT DIVIDED POINT IS ASSOCIATED WITH CLEAR SCENE TO BE MANAGED

BALL TRACK INFORMATION

|   | TRACK CHANGE TIME | BALL POSITION (X, Y) | BALL MOVEMENT VECTOR | SUBJECT (TEAM) |
|---|---|---|---|---|
| a | 00:12:15 | (220, 300) | (-6, 2) | A TEAM |
| b | 00:12:17 | (350, 250) | (-4, 10) | A TEAM |
| c | 00:12:18 | (550, 150) | (10, -4) | B TEAM |
| d | 00:12:22 | (200, 650) | (11, 10) | A TEAM |
| e | 00:12:25 | (550, 550) | (11, 10) | A TEAM |

SCENE SEGMENT INFORMATION

|   |   |   |   |   |   |
|---|---|---|---|---|---|
| a | 00:12:15 | (220, 300) | (-6, 2) | A TEAM |  |
| b | 00:12:17 | (350, 250) | (-4, 10) | A TEAM |  |
| c | 00:12:18 | (550, 150) | (10, -4) | B TEAM | CLEAR |

SCENE SEGMENT INFORMATION

|   |   |   |   |   |   |
|---|---|---|---|---|---|
| c | 00:12:18 | (550, 150) | (10, -4) | B TEAM | CLEAR |
| d | 00:12:22 | (200, 650) | (11, 10) | A TEAM |  |
| e | 00:12:25 | (550, 550) | (11, 10) | A TEAM |  |

FIG. 12

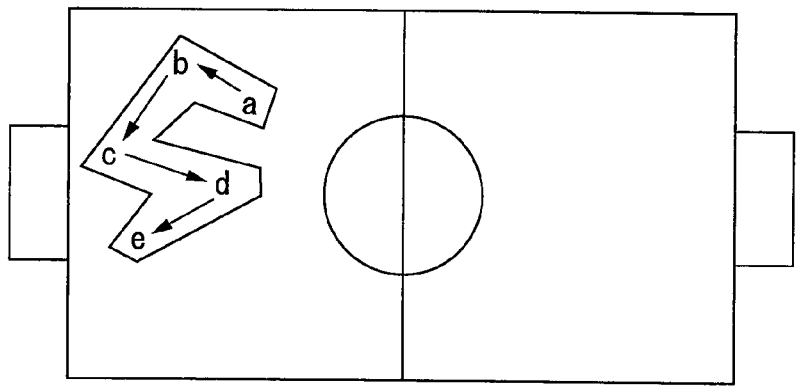

- SUBJECT TEAMS OF BALL TRACK INFORMATION c AND BALL TRACK INFORMATION d IMMEDIATELY THEREAFTER ARE DIFFERENT, DIFFERENCE IN TIME IS SMALL AND DIFFERENCE IN POSITION IS SMALL. SCENE DIVISION IS NOT PERFORMED BALL TRACK INFORMATION AT DIVIDED POINT IS ASSOCIATED WITH CLEAR SCENETO BE MANAGED

BALL TRACK INFORMATION

|   | TRACK CHANGE TIME | BALL POSITION (X, Y) | BALL MOVEMENT VECTOR | SUBJECT (TEAM) |
|---|---|---|---|---|
| a | 00:12:15 | (300, 320) | (-6, 2) | A TEAM |
| b | 00:12:17 | (220, 230) | (-4, 10) | A TEAM |
| c | 00:12:18 | (400, 150) | (10, -4) | B TEAM |
| d | 00:12:22 | (500, 300) | (11, 10) | A TEAM |
| e | 00:12:25 | (580, 180) | (11, 10) | A TEAM |

SCENE SEGMENT INFORMATION

|   |   |   |   |   |   |
|---|---|---|---|---|---|
| a | 00:12:15 | (300, 320) | (-6, 2) | A TEAM | CONFUSED FIGHT STAGE |
| b | 00:12:17 | (220, 230) | (-4, 10) | A TEAM | |
| c | 00:12:18 | (400, 150) | (10, -4) | B TEAM | |
| d | 00:12:22 | (500, 300) | (11, 10) | A TEAM | |
| e | 00:12:25 | (580, 180) | (11, 10) | A TEAM | |

FIG. 13

| BALL TRACK INFORMATION(N) LOOP | |
|---|---|
| | TRACK CHANGE TIME |
| | BALL POSITION |
| | BALL MOVEMENT VECTOR |
| | SUBJECT (TEAM NAME) |

BALL TRACK INFORMATION (DATA STRUCTURE)

FIG. 14

| BALL TRACK INFORMATION ① | |
|---|---|
| | 00:12:00 |
| | 400, 300 |
| | -5, 2 |
| | A TEAM |
| BALL TRACK INFORMATION ② | |
| | 00:12:10 |
| | 200, 350 |
| | -10, 6 |
| | A TEAM |
| BALL TRACK INFORMATION ③ | |
| | 00:12:20 |
| | 60, 380 |
| | 2, 16 |
| | A TEAM |

BALL TRACK INFORMATION (DATA STORING EXAMPLE)

TEAM INFORMATION (DATA STRUCTURE)

TEAM INFORMATION (DATA STORING EXAMPLE)

FIG. 17

| COORDINATES INDICATION LINE OF FIELD |
|---|
| $(X_a, Y_a)$ |
| $(X_a, Y_b)$ |
| $(X_b, Y_a)$ |
| $(X_b, Y_b)$ |

FIELD INFORMATION (DATA STRUCTURE)

FIG. 18

| COORDINATES INDICATION LINE OF FIELD |
|---|
| (100, 100) |
| (100, 900) |
| (900, 100) |
| (900, 900) |

FIELD INFORMATION (DATA STORING EXAMPLE)

FIG. 19

| REFEREE SIGN INFORMATION (LOOP) | |
|---|---|
| | OCCURRENCE TIME |

REFEREE SIGN INFORMATION (DATA STRUCTURE)

FIG. 20

| REFEREE SIGN INFORMATION ① | |
|---|---|
| | 00:12:05 |
| REFEREE SIGN INFORMATION ② | |
| | 00:12:30 |
| REFEREE SIGN INFORMATION ③ | |
| | 00:13:00 |

REFEREE SIGN INFORMATION (DATA STORING EXAMPLE)

FIG. 21

| BREAK INFORMATION (LOOP) |
|---|
| START TIME |
| END TIME |

BREAK INFORMATION (DATA STRUCTURE)

FIG. 22

| BREAK INFORMATION ① |
|---|
| 00:12:00 |
| 00:12:20 |
| BREAK INFORMATION ② |
| 00:12:30 |
| 00:12:40 |
| BREAK INFORMATION ③ |
| 00:12:50 |
| 00:13:10 |

BREAK INFORMATION (DATA STORING EXAMPLE)

FIG. 23

| SCENE INFORMATION (LOOP) | |
|---|---|
| | STATE (IN, PLAY) |
| | OFFENSE TEAM NAME |
| | START TIME |
| | END TIME |

SCENE INFORMATION (DATE STRUCTURE)

FIG. 24

| SCENE INFORMATION ① | |
|---|---|
| | IN PLAY |
| | A TEAM |
| | 00:12:00 |
| | 00:12:20 |
| SCENE INFORMATION ② | |
| | IN PLAY |
| | A TEAM |
| | 00:12:20 |
| | 00:12:50 |

SCENE INFORMATION (DATE STORING EXAMPLE)

SCENE SEGMENT DIVIDING DEVICE

THIS APPLICATION IS A U.S. NATIONAL PHASE APPLICATION OF PCT INTERNATIONAL APPLICATION PCT/JP2006/300482.

FIELD OF THE INVENTION

The present invention relates to a technique showing a sports image and structure information thereon.

RELATED ART

There has been known a technique which divides sports images of a succor game into an in play segment and a break segment and can digest view the images in the in play segment (see Patent Reference 1). In Patent Reference 1, the proportion of background color is determined based on a sports image to provide a photographing form in such a manner that when it is high, a wide image is used and that when it is low, a zoom image is used, and an average movement amount is determined based on the previous and next images. The point where wide images are mainly used in the photographing form and the average movement amount is large is judged to be in the in play segment. Other points are judged to be in the break segment. This can digest view the images in the in play segment. There has also been known a technique identifying a ball displayed in a sports image to specify the contents of play based on movement of the ball (see Non-Patent Reference 1). In Non-Patent Reference 1, the ball displayed in the sports image is identified to extract a change point based on movement of the ball, the player closest to the ball at this point is specified as a subject who has performed the action, and the contents of play which has been performed by the subject, e.g., dribble, keep, pass, shoot, clear, and the like are specified based on the position relation between the ball and the subject or the ball movement direction thereafter. In Non-Patent Reference 1, field information is also managed, whether or not the ball is inside the field is judged from the ball position and the field information, thereby dividing sports images into the in play segment and the break segment. This can digest view the images in the in play segment.

Patent Reference 1: Japanese Patent Application No. 2004-40750

Non-Patent Reference: Succor ni okeru senshu no play hantei, Department of Information & Computer Science, Department of Science and Technology, Keio University, Takuya Nagase and Makoto Ozawa In Patent Reference 1, when zoom images are frequently used in the photographing form, they can be misjudged to be in the break segment though they are in the in play segment. When cut images are frequently used, the previous and next images are greatly changed so that the average movement amount is judged to be large. They can be misjudged to be in the in play segment though they are in the break segment. In Patent Reference 1, though the camera photographing image and the average movement amount obtained from the previous and next images are used, the images are misjudged to be the in play segment or the break segment. Digest viewing cannot be precisely done.

In Non-Patent Reference 1, when the ball position is outside the field, the break segment can be precisely specified based on the ball position and the field information. When the ball position is inside the field and the break segment occurs due to a foul, the break segment cannot be precisely specified. Dribble and pass performed by the player immediately after the foul are in the break segment, but can be judged to be in the in play segment.

For sports images of a succor game, it is required to divide the in play segment into scene segments and manage them in order that the user can digest view scenes to be viewed most. There is performed a process of dividing sports images into the in play segment in which the game is progressing and the break segment in which the game is stopped. Thereafter, the images in the in play segment are divided when there are offence and defense change and offense break. A series of offenses can be divided as one scene segment to be managed.

In Patent Reference 1 and Non-Patent Reference 1, offense and defense change and offense break in the in play segment cannot be precisely identified. A series of offenses cannot be divided as one scene segment. The in play segment cannot be divided into scene segments. In Non-Patent Reference 1, offense and defense change and offense break are specified and divided as a scene segment at the point where the subject teams are changed at a ball track change point. When the players are competing with each other in a confused fight state, the subject teams are frequently changed in a series of offenses. Each of the changes is divided as a scene segment. A series of offense scenes are formed by plural scene segments and are divided into small pieces.

SUMMARY OF THE INVENTION

An object of the present invention is to provide a scene segment dividing device which can precisely specify a break segment when zoom and cut images are frequently used in a sports image photographing form or when a foul occurs at the time a ball is inside a field, can precisely manage a series of offenses as one scene segment without performing scene segment division for each change of subjects when there is a confused fight state in an in play segment, and can divide and manage the scene segment of a series of offenses ended by clear.

A scene segment dividing device of the present invention has a ball track information storage unit that manages ball track information specifying a subject for each track change of a ball displayed in a sports image; a ball fixed-time stop point extraction unit that uses the ball track information to extract a point where movement of the ball is stopped for a fixed time; a ball closest point extraction unit that uses the ball track information to extract a point closest to the ball position stopped for a fixed time; a break segment specification unit that acquires ball track information from the ball track information storing unit to specify break segments based on the points extracted by the ball fixed-time stop point extraction unit and the ball closest point extraction unit; and a scene segment division unit that extracts ball track information in an in play segment based on the specified break segments to divide the information into scene segments.

The scene segment dividing device of the present invention can precisely specify a break segment when zoom and cut images are frequently used in a sports image photographing form or when a foul occurs at the time a ball is inside a field, can precisely manage a series of offenses as one scene segment without performing scene segment division for each change of subjects when there is a confused fight state in an in play segment, and can divide and manage the scene segment of a series of offenses ended by clear.

BRIEF DESCRIPTION OF DRAWINGS

FIG. 4 is a flowchart showing a processing procedure specifying a break segment using the ball position of ball track information;

FIG. 5 is a diagram showing information used for specifying a break segment based on the ball position;

FIG. 6 is a flowchart showing a processing procedure specifying a break segment using the occurrence time of referee sign information;

FIG. 7 is a diagram showing information used for specifying a break segment based on the occurrence time of a referee sign;

FIG. 9 is a diagram showing information used for specifying a break segment based on the ball movement vector;

FIG. 11 is a diagram showing ball track information when performing scene segment division (clear scene);

FIG. 12 is a diagram showing ball track information when not performing scene segment division (a confused fight state);

FIG. 13 is a diagram showing the data structure of ball track information;

FIG. 14 is a diagram showing a data storing example in a ball track information storage unit;

FIG. 17 is a diagram showing the data structure of field information;

FIG. 18 is a diagram showing a data storing example in a field information storage unit;

FIG. 19 is a diagram showing the data structure of referee sign information;

FIG. 20 is a diagram showing a data storing example in a referee sign information storage unit;

FIG. 21 is a diagram showing the data structure in a break segment;

FIG. 22 is a diagram showing a data storing example in a break segment storage unit;

FIG. 23 is a diagram showing the data structure in a scene segment;

FIG. 24 is a diagram showing a data storing example in a scene segment storage unit;

DESCRIPTION OF THE PREFERRED EMBODIMENTS

A best mode for carrying out the present invention will be described. The present invention is not limited to the following embodiments and can be appropriately modified and embodied within the scope without departing from the purport of the present invention.

Embodiment 1

Embodiment 1 of the present invention will be described below. In this embodiment, a device on the sports image delivery side has a scene segment dividing device. The scene segment dividing device specifies break segments from track information on a ball displayed in a photographed sports image, extracts an in play segment based on these, divides the in play segment into many scene segments to manage them, and transmits them to a terminal on the sports image receiving side.

Figure 1:
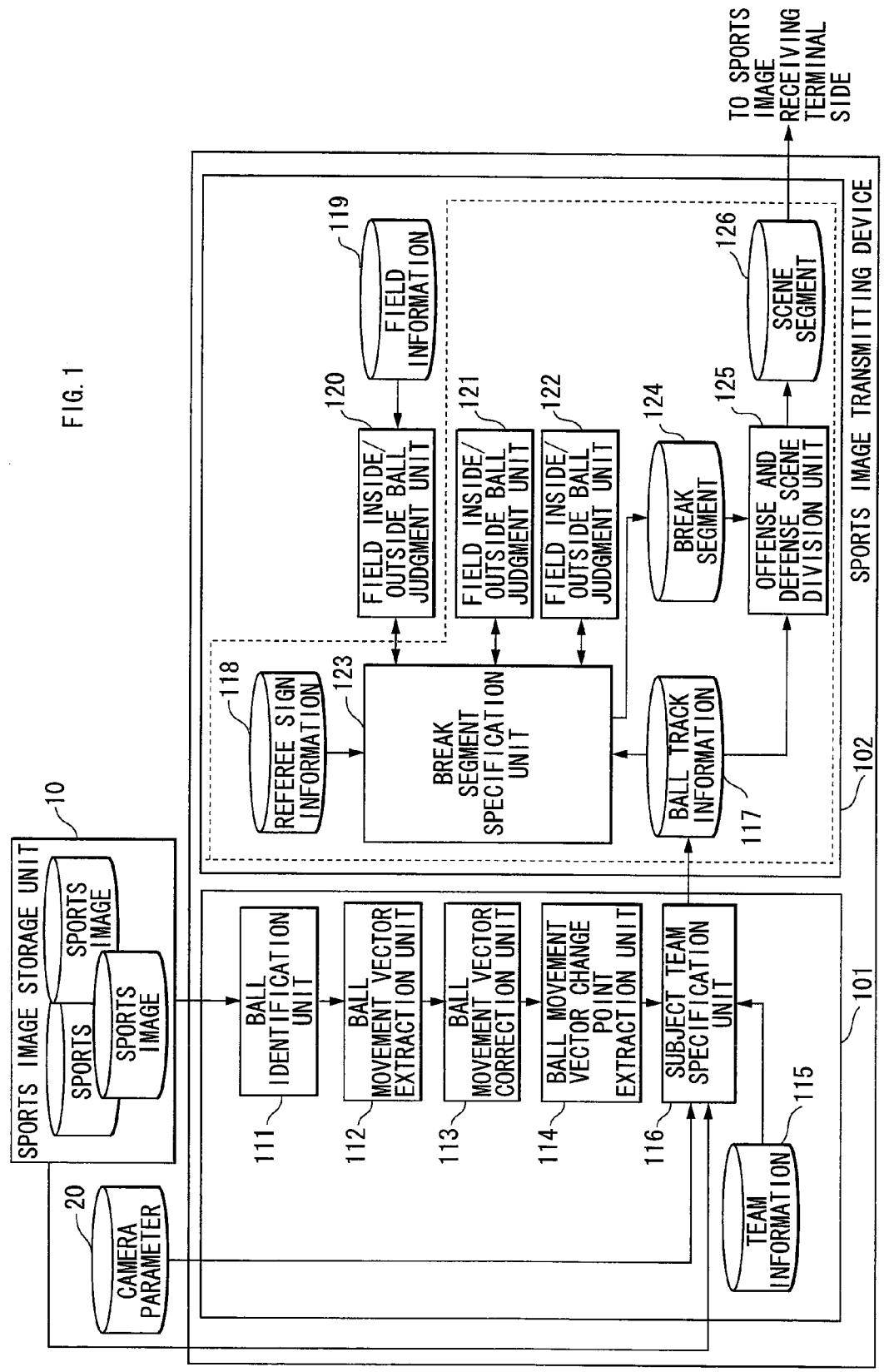
FIG. 1 is an inner configuration block diagram of a sports image transmitting device having a scene segment dividing device according to an embodiment of the present invention.

As shown in FIG. 1, a sports image transmitting device 100 is broadly divided into a ball track information acquisition unit 101 and a scene segment division unit 102. The ball track information acquisition unit 101 is a block acquiring ball track information using a sports image storage unit 10 storing many sports images photographed by a camera and a camera parameter storage unit 20 managing information such as movement of the camera and change in photographing angle during photographing. The scene segment division unit 102 is a block specifying break segments of a sports image based on ball track information acquired from the ball track information acquisition unit 101, extracting an in play segment based on these, and dividing the in play segment into many scene segments to manage them.

Figure 15:
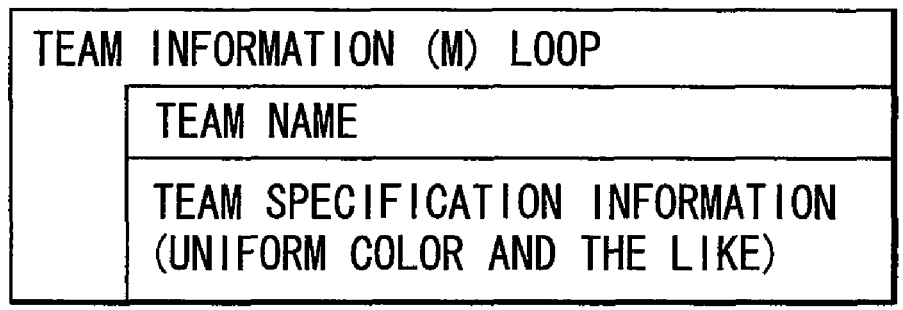
FIG. 15 is a diagram showing the data structure of team information.
Figure 16:
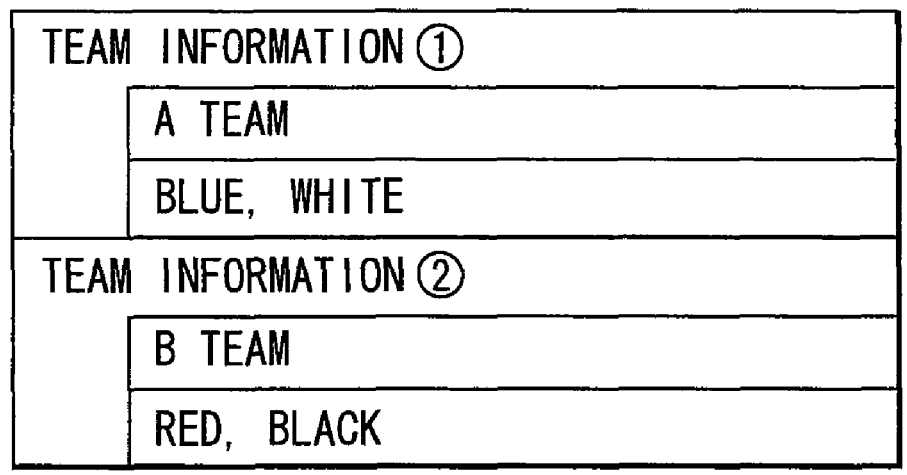
FIG. 16 is a diagram showing a data storing example in a team information storage unit.

The ball track information acquisition unit 101 has a ball identification unit 111 identifying a ball displayed in an image from the sports image storage unit 10, a ball movement vector extraction unit 112 extracting movement of the identified ball, a ball movement vector correction unit 113 correcting an error of movement of the ball displayed in the sports image caused by movement of the camera and change in photographing angle using the camera parameter managed by the camera parameter storage unit 20, a ball movement vector change point extraction unit 114 extracting a change point from the corrected movement of the ball, a team information storage unit 115 managing information such as uniform color associated with a team name for specifying a team, and a subject team specification unit 116 acquiring the images at the ball movement vector change points and the camera parameters to specify the player closest to the ball at the change point as a subject, specifying team information on the subject using the team information storage unit 115, and acquiring ball track information including the track change time, ball position, ball movement vector, and team information on the subject at each of the ball track change points. To specify a team to which the subject belongs, the team information storage unit 115 manages information such as uniform color or pattern (see FIGS. 15 and 16).

The scene segment division unit 102 has a ball track information storage unit 117 receiving and managing ball track information from the subject team specification unit 116, a referee sign information storage unit 118 managing referee sign information at each occurrence time, a field information storage unit 119 managing the line of a field by X and Y coordinates, a field inside/outside ball judgment unit 120 using ball track information and field information to judge whether the ball position at a ball track change point is inside or outside the field, a ball fixed-time stop point extraction unit 121 extracting, based on ball track information, the point where the ball is stopped for a fixed time, a ball position closest point extraction unit 122 extracting the ball track change point closest to the ball position at the ball track change point, a break segment specification unit 123 specifying a break segment based on ball track information using the ball track information in the ball track information storage unit 117, the judged result of the field inside/outside ball judgment unit 120, the extracted results of the ball fixed-time stop point extraction unit 121 and the ball position closest point extraction unit 122, or referee sign information in the referee sign information storage unit 118, a break segment storage unit 124 receiving and managing the specified break segment, an offense and defense scene division unit 125 extracting an in play segment based on the ball track information in the ball track information storage unit 117 and the break segment in the break segment storage unit 124 to divide the in play segment into a series of offense scene segments, and a scene segment storage unit 126 managing the divided scene segments.

Here, the ball track information storage unit 117 manages the time, the ball position indicated by X and Y coordinates, the ball movement vector, and the subject team at each ball track change point (see FIGS. 13 and 14). The referee sign storage unit 118 manages referee sign time for each occurrence (see FIGS. 19 and 20). Referee sign time registration means includes means in which a registering person checks and registers time at which a referee blows the whistle during a game, and means in which a transmitting device is provided in the whistle of the referee, which performs wireless communication when the referee blows the whistle, and in which the sports image transmitting device 100 registers reception time. The field information storage unit 119 manages the line of the field by the X and Y coordinates and uses this to judge whether or not the ball position indicated by the X and Y coordinates of ball track information is inside the field (see FIGS. 17 and 18). The break segment storage unit 124 manages start time and end time in each break segment (FIGS. 21 and 22). The scene segment storage unit 126 manages the offense team name, start time, and end time in each scene segment (FIGS. 23 and 24).

Figure 2:
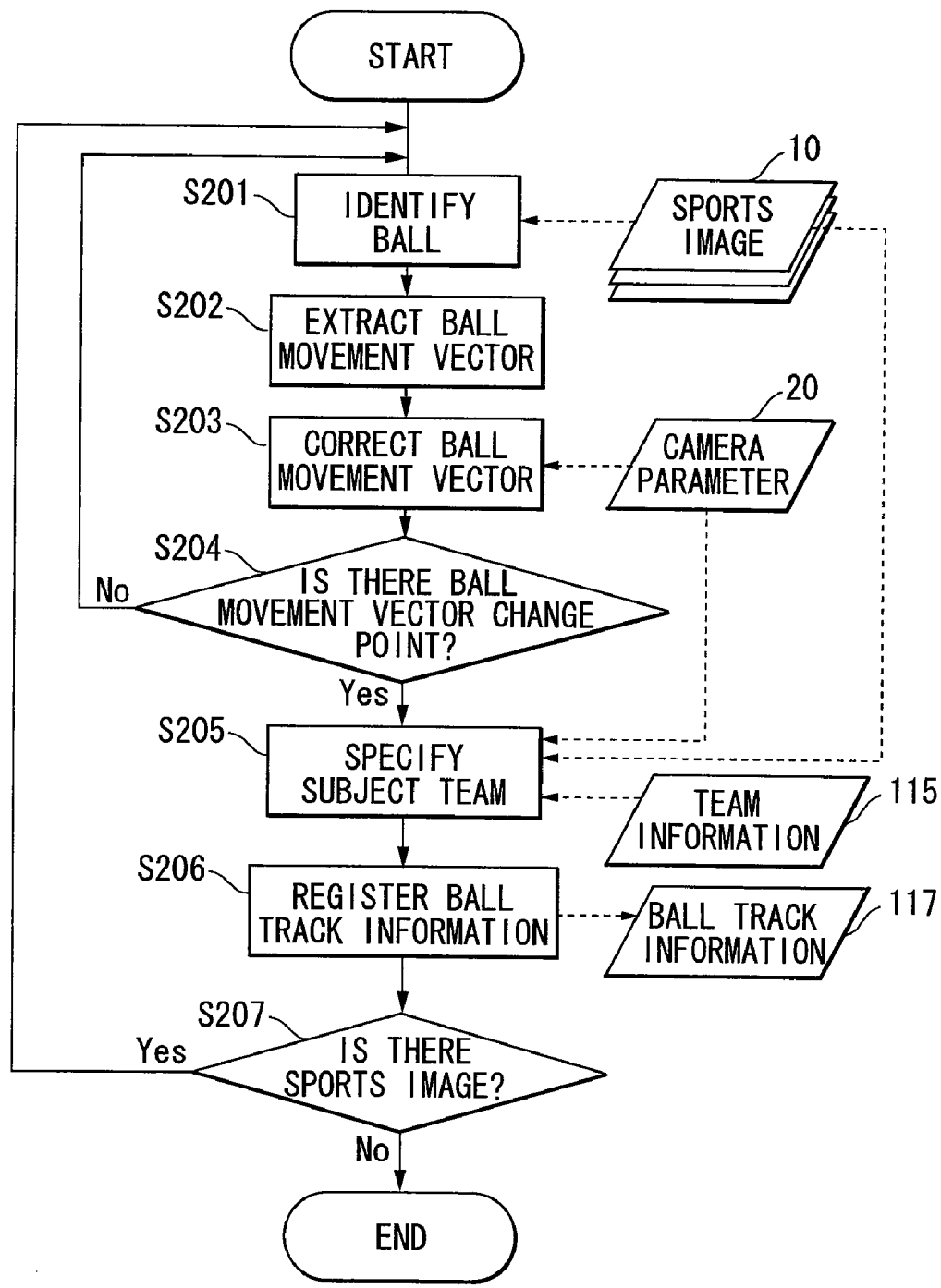
FIG. 2 is a flowchart showing a processing procedure acquiring ball track information.

The procedure of acquiring ball track information in the ball track information acquisition unit 101 will be described using FIG. 2. In step 201, the ball identification unit 111 identifies a ball displayed in an image from the sports image storage unit 10. In step 202, the ball movement vector extraction unit 112 tracks movement of the identified ball and extracts the ball movement vector. The extracted ball movement vector is affected by movement of the camera and change in photographing angle during photographing of the sports image to cause an error. In step 203, the ball movement vector correction unit 113 uses the camera parameter storage unit 20 managing camera information such as movement of the camera which has photographed the sports image and change in photographing angle to correct the extracted ball movement vector. In step 204, the ball movement vector change point extraction unit 114 judges whether or not there is a change point in the corrected ball movement vector. If yes, the routine is advanced to step 205. If no, the routine is returned to step 201. In step 205, the subject team specification team 116 uses the sports images at the ball movement vector change points and the camera parameters to acquire a precise image, specifies the player closest to the ball at this point as a subject, uses team information in the team information storage unit 115 to specify the team to which the subject belongs, and acquires ball track information specifying the time, ball position, ball movement vector, and subject (team name) at this point. In step 206, the acquired ball track information is registered into the ball track information storage unit 117. In step 207, it is judged whether or not there is the next sports image. If yes, the routine is returned to step 201 to perform processing in steps 201 to 206. If no, the processing is ended. In the above steps, the sports image photographed at many points of view and the camera parameters managing movement of the camera which has photographed it and change in photographing angle are used to acquire ball track information.

Figure 3:
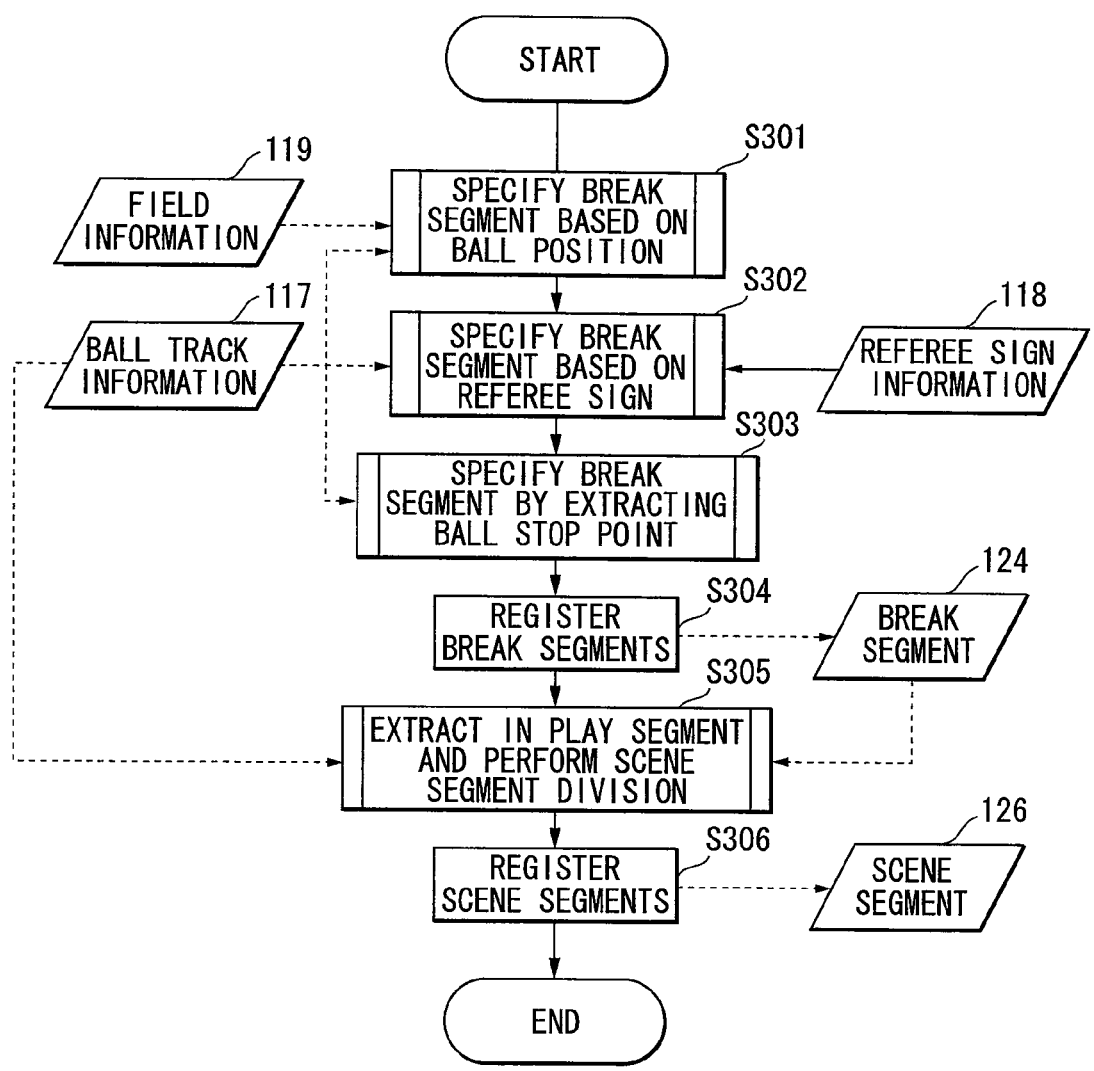
FIG. 3 is a flowchart showing a processing procedure performing scene segment division.

The scene segment division procedure in the scene segment division unit 102 will be described using FIG. 3. In step 301, the ball track information storage unit 117 registers ball track information transmitted from the ball track information acquisition unit 101. The field inside/outside ball judgment unit 120 uses the ball track information and field information in the field information storage unit 119 to specify a break segment based on the ball position. In step 302, the break segment specification unit 123 uses information other than the ball track information in the break segment specified based on the ball position in step 301 and referee sign information in the referee sign information storage unit 118, and specifies ball track information immediately thereafter as a break start point. The break segment specification unit 123 uses ball track information immediately thereafter and allows the ball fixed-time stop extraction unit 121 to extract track information in which the ball is stopped for a fixed time or allows the ball position closest point extraction unit 122 to extract the track information in the position closest to the ball track information immediately before the referee sign, thereby specifying a break end point. In step 303, the break segment specification unit 123 uses information other than the ball track information in the break segment specified based on the ball position in step 301 and the break segment specified based on the referee sign in step 302, and allows the ball fixed-time stop point extraction unit 121 to extract the point where the ball is stopped for a fixed time, thereby specifying a break end point. The break segment specification unit 123 uses ball track information immediately therebefore to allow the ball position closest point extraction unit 122 to acquire the track information in the position closest to the break end point and to extract the track information immediately thereafter, thereby specifying a break start point. In step 304, the break segment specification unit 123 registers the break segments specified in steps 301 to 303 into the break segment storage unit 124. In step 305, the offense and defense scene division unit 125 extracts an in play segment based on the ball track information in the ball track information storage unit 117 and the break segment in the break segment storage unit 124 and divides the in play segment into a series of offense scene segments. In step 306, the offense and defense scene division unit 125 registers the divided scene segments into the scene segment storage unit 126. In step 307, it is judged whether or not there is the next ball track information. If yes, the routine is returned to step 301 to perform processing in steps 301 to 306. If no, the processing is ended. In the above steps, the ball track information acquired from the ball track information acquisition flow is used to divide the sports images into the break segment and the in play segment. The in play segment can be divided into a series of offense scenes. The processing in steps 301 to 303 may be performed in parallel. There will be described scene segment division in the break segment specified based on the ball position in step 301, the break segment specified based on the referee sign in step 302, the break segment specified based on the ball start point in step 303, and the in play segment in step 305.

The processing procedure specifying a break segment based on the ball position of ball track information will be described using FIG. 4. In step 401, the break segment specification unit 123 acquires ball track information from the ball track information storage unit 117. There can be considered means for acquiring ball track information one by one from the ball track information storage unit 117, means for acquiring plural pieces of successive ball track information therefrom, and means for acquiring all ball track information therefrom. Any of these means may be used. For instance, in FIG. 5, the break segment specification unit 123 acquires ball track information a to f. In step 402, when the ball track information can be acquired, the routine is advanced to step 403, and when not, the processing is ended. In step 403, the break segment specification unit 123 transmits one of the acquired ball track information to the field inside/outside ball judgment unit 120. The field inside/outside ball judgment unit 120 uses the field information managed in the field information storage unit 119 to judge whether or not the acquired ball track information is inside the field. In step 404, when the ball track information is judged to be inside the field, the routine is advanced to step 405, and when the ball track information is judged to be outside the field, the routine is advanced to step 410. In FIG. 5, when the break segment specification unit 123 transmits the ball track information a to the field inside/outside ball judgment unit 120, the field inside/outside ball judgment unit 120 uses the field information managed in the field information storage unit 119 to judge whether or not the ball position (400, 300) of the acquired ball track information a is inside the field (100, 100), (100, 100) (100, 100), and (100, 100). The ball track information a is judged to be inside the field, and the routine is advanced to step 405. When the break segment specification unit 123 transmits the ball track information d to the field inside/outside ball judgment unit 120, the field inside/outside ball judgment unit 120 judges that the ball position (70, 600) of the acquired ball track information d is judged to be outside the field and the routine is advanced to step 410.

In step 405, the field inside/outside ball judgment unit 120 acquires, from the break segment specification unit 123, ball track information immediately after the ball track information judged to be inside the field. In FIG. 5, there is the ball track information b immediately after the ball track information a. The field inside/outside ball judgment unit 120 acquires the ball track information b from the break segment specification unit 123. In step 406, as in step 402, the field inside/outside judgment unit 120 uses the field information managed in the field information storage unit 119 to judge whether or not the acquired ball track information is inside the field. In step 407, when the acquired ball track information is also judged to be inside the field, the routine is returned to step 405 to acquire ball track information immediately thereafter from the break segment specification unit 123, thereby performing steps 405 and 406 again. When the acquired ball track information is judged to be outside the field, the routine is advanced to step 408. In FIG. 5, the ball position (200, 350) of the acquired ball track information b is inside the field. The field inside/outside ball judgment unit 120 acquires the ball track information c immediately thereafter from the break segment specification unit 123 and judges whether or not the ball track information c is inside the field. The ball position (60, 380) of the acquired ball track information c is outside the field. In this case, the routine is advanced to step 408. In step 408, the field inside/outside ball judgment unit 120 identifies the ball track information judged to be outside the field as a break start point and sends the ball track information to the break segment specification unit 123. Here, the field inside/outside ball judgment unit 120 identifies the ball track information c as the break start point and sends this to the break segment specification unit 123. In step 409, the break segment specification unit 123 to which the ball track information indicating the break start point is sent registers the ball track information into the break segment storage unit 124. Here, the break segment specification unit 123 registers the ball track information c as the break start point into the break segment storage unit 124.

In step 410, the field inside/outside ball judgment unit 120 acquires ball track information immediately after ball track information judged to be outside the field from the break segment specification unit 123. In FIG. 5, there is the ball track information e immediately after the ball track information d. The field inside/outside ball judgment unit 120 acquires the ball track information e from the break segment specification unit 123. In step 411, as in step 402, the field inside/outside judgment unit 120 uses the field information managed in the field information storage unit 119 to judge whether or not the acquired ball track information is inside the field. In step 412, when the ball track information is also judged to be outside the field, the routine is returned to step 409 to acquire ball track information immediately thereafter from the break segment specification unit 123, thereby performing steps 410 and 411 again. When the ball track information is judged to be inside the field, the routine is advanced to step 412. In FIG. 5, the ball position (60, 380) of the acquired ball track information e is outside the field. The field inside/outside ball judgment unit 120 acquires the ball track information f immediately thereafter from the break segment specification unit 123 and judges whether or not the ball track information f is inside the field. The ball position (220, 650) of the acquired ball track information f is inside the field. In this case, the routine is advanced to step 413. In step 413, the field inside/outside ball judgment unit 120 identifies ball track information immediately before the ball track information judged to be inside the field as a break end point, identifies ball track information acquired up to the break end point as a break segment, and sends these ball track information pieces to the break segment specification unit 123. Here, the field inside/outside ball judgment unit 120 identifies the ball track information e as the break end point, identifies the ball track information d acquired up to the break end point as a break segment, and sends the ball track information d and e to the break segment specification unit 123. In step 414, the break segment specification unit 123 to which the ball track information indicating the break end point and the break segment is sent registers these ball track information pieces into the break segment storage unit 124. Here, the break segment specification unit 123 registers the ball track information e as the break end point and the ball track information d in the break segment into the break segment storage unit 124. In step 415, the break segment specification unit 123 acquires the next ball track information from the ball track information storage unit 117. In step 416, the break segment specification unit 123 judges whether or not there is the next ball track information. If yes, the routine is returned to step 403 to perform processing in steps 403 to 414 again. If no, the processing is ended. In the above processing, the break segment outside the field can be specified using the ball position and the field information of the ball track information.

The processing procedure specifying a break segment based on the occurrence time of referee sign information will be described using FIG. 6. In step 601, the break segment specification unit 123 acquires referee sign information from the referee sign information storage unit 118. Here, the break segment specification unit 123 does not acquire referee sign information which has occurred at the time of the break segment outside the field specified based on the ball position. The break segment specification unit 123 acquires referee sign information which has occurred when the ball is inside the field. There can be considered means for acquiring referee sign information pieces one by one from the referee sign information storage unit 118, means for acquiring plural pieces of successive referee sign information therefrom, and means for acquiring all referee sign information therefrom. Any of these means may be used. For instance, in FIG. 7, the break segment specification unit 123 acquires referee sign information in which referee sign time is 00:12:05. In step 602, when the referee sign information can be acquired, the routine is advanced to step 603, and when not, the processing is ended. In step 603, ball track information immediately after the referee sign time is acquired from the ball track information storage unit 117. In this case, ball track information other than the break segment outside the field specified based on the ball position in step 301 is acquired. For instance, in FIG. 7, as the ball track information immediately after the referee sign time, the ball track information b at 00:12:10 is acquired based on the track change time. In step 604, the acquired ball track information is identified as a break start point. After it is identified as the break start point, in step 605, plural pieces of ball track information within a fixed time immediately thereafter are acquired. In step 606, the point where the ball is stopped for a fixed time is extracted from these ball track information pieces. In step 607, when there is the point where the ball is stopped for a fixed time, the routine is advanced to step 608, and when not, the routine is advanced to step 609. In step 608, ball track information in which the ball is stopped for a fixed time is acquired to identify the acquired ball track information as a break end point. In FIG. 7, the ball track information b to e is acquired. As the ball track information in which the ball is stopped for a fixed time, the ball track information d in which the ball movement vector is (0, 0) is acquired from the ball track information b to e. This point is identified as the break end point.

In step 609, there is not the point where the ball is stopped for a fixed time. In this case, ball track information immediately before the referee sign time is acquired. For instance, in FIG. 7, when there is not the ball track information in which the ball movement vector is (0, 0), the ball track information a immediately before the referee sign time is acquired. In step 610, ball track information closest to the acquired ball track information is acquired. Here, the ball position of the ball track information a is (500, 300), and the closest position of the ball track information b to e is (520, 320). The ball track information d is acquired. This point is identified as the break end point.

In step 611, the break segment is from the break start point identified in step 604 to the break end point identified in step 608 or 610. The break segment specification unit 123 registers the break segment into the break segment storage unit 124. Here, the break segment specification unit 123 registers, into the break segment storage unit 124, the break segment from the ball track information b as the break start point to the ball track information d as the break end point. In step 612, the break segment specification unit 123 judges whether or not there is the next referee sign information. If yes, the routine is returned to step 603 to perform processing in steps 603 to 611 again. If no, the processing is ended. In the above processing, the ball track information other than the break segment outside the field specified based on the ball position in step 301 and the referee sign information in the referee sign information storage unit 118 are used to specify the break segment inside the field.

Figure 8:
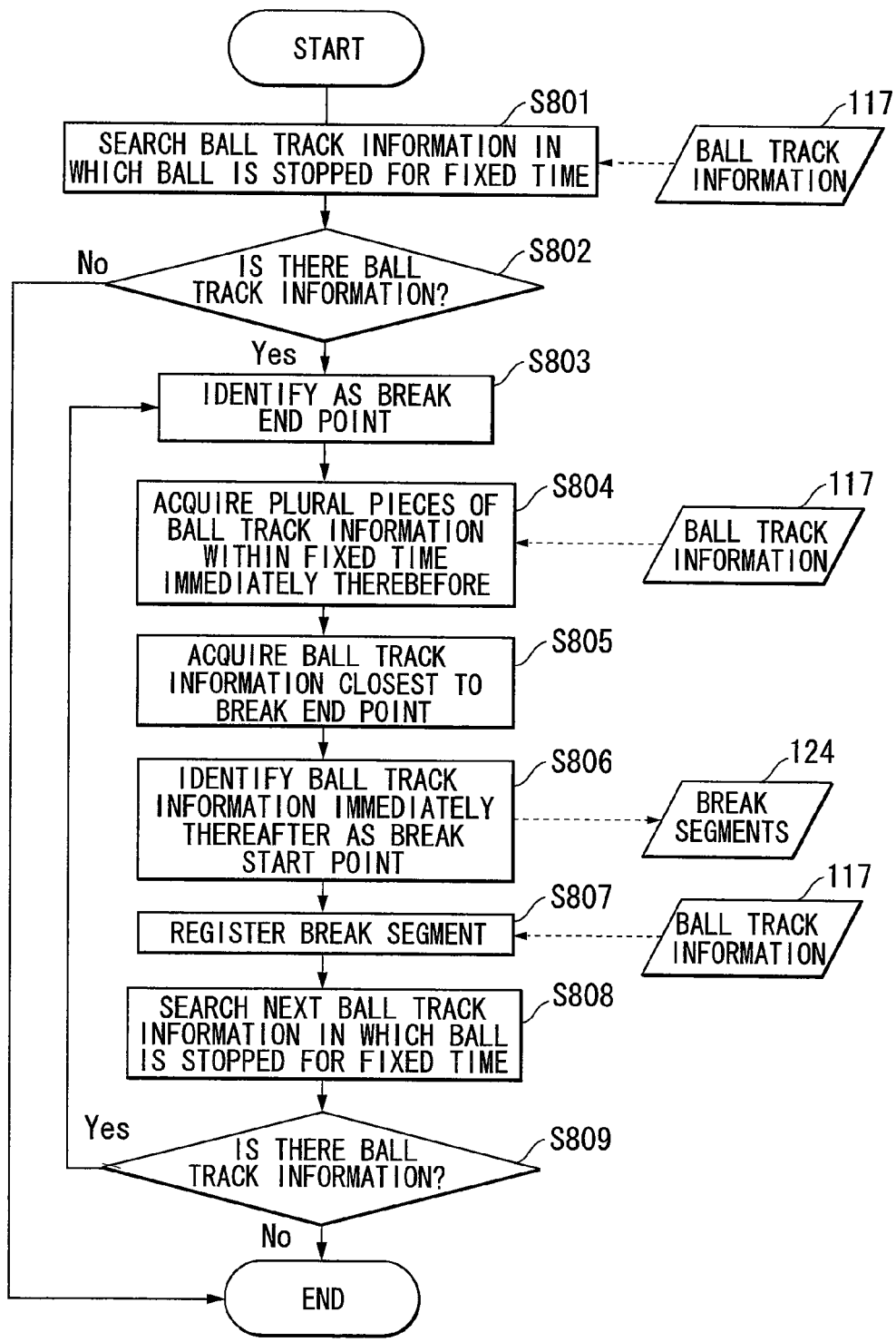
FIG. 8 is a flowchart showing a processing procedure specifying a break segment using the ball movement vector of ball track information.

The procedure specifying a break segment based on the ball movement vector of ball track information will be described using FIG. 8. In step 801, the break segment specification unit 123 uses the ball track information storage unit 117, acquires ball track information other than the ball track information in the break segment specified based on the ball position in step 301 and the break segment specified based on the referee sign in step 302, and acquires ball track information in which the ball is stopped for a fixed time. In step 802, when the ball track information can be acquired, the routine is advanced to step 803, and when not, the processing is ended. In FIG. 9, the ball movement vector of the ball track information in which the ball is stopped for a fixed time is (0, 0).

The ball is judged to be stopped at this point to acquire the ball track information d. In step 803, the acquired ball track information is identified as a break end point. After it is identified as the break end point, in step 804, plural pieces of ball track information within a fixed time immediately thereafter are acquired. In step 805, ball track information closest to the break end point is acquired from these ball track information. Here, the ball position at the break end point is (520, 320). The closest position of plural pieces of the ball track information a to c immediately therebefore is (500, 300). The ball track information a is acquired. The position of the ball track information a is identified as the end point of an in play segment. In step 806, ball track information immediately thereafter is acquired. This point is identified as a break start point. Here, the ball track information b is acquired to identify this point as the break start point.

In step 807, the break segment specification unit 123 registers, into the break segment storage unit 124, the break segment from the break start point identified in step 806 to the break end point identified in step 803. Here, the break segment specification unit 123 registers, into the break segment storage unit 124, the break segment from the ball track information b at the break start point to the ball track information d at the break end point. In step 808, it is judged whether or not there is the next ball track information in which the ball is stopped for a fixed time. If yes, the routine is returned to step 803 to perform processing in steps 803 to 808 again. If no, the processing is ended. In the above processing, the ball movement vector of the ball track information is used to extract the ball fixed-time stop point, thereby specifying the break segment.

Figure 10:
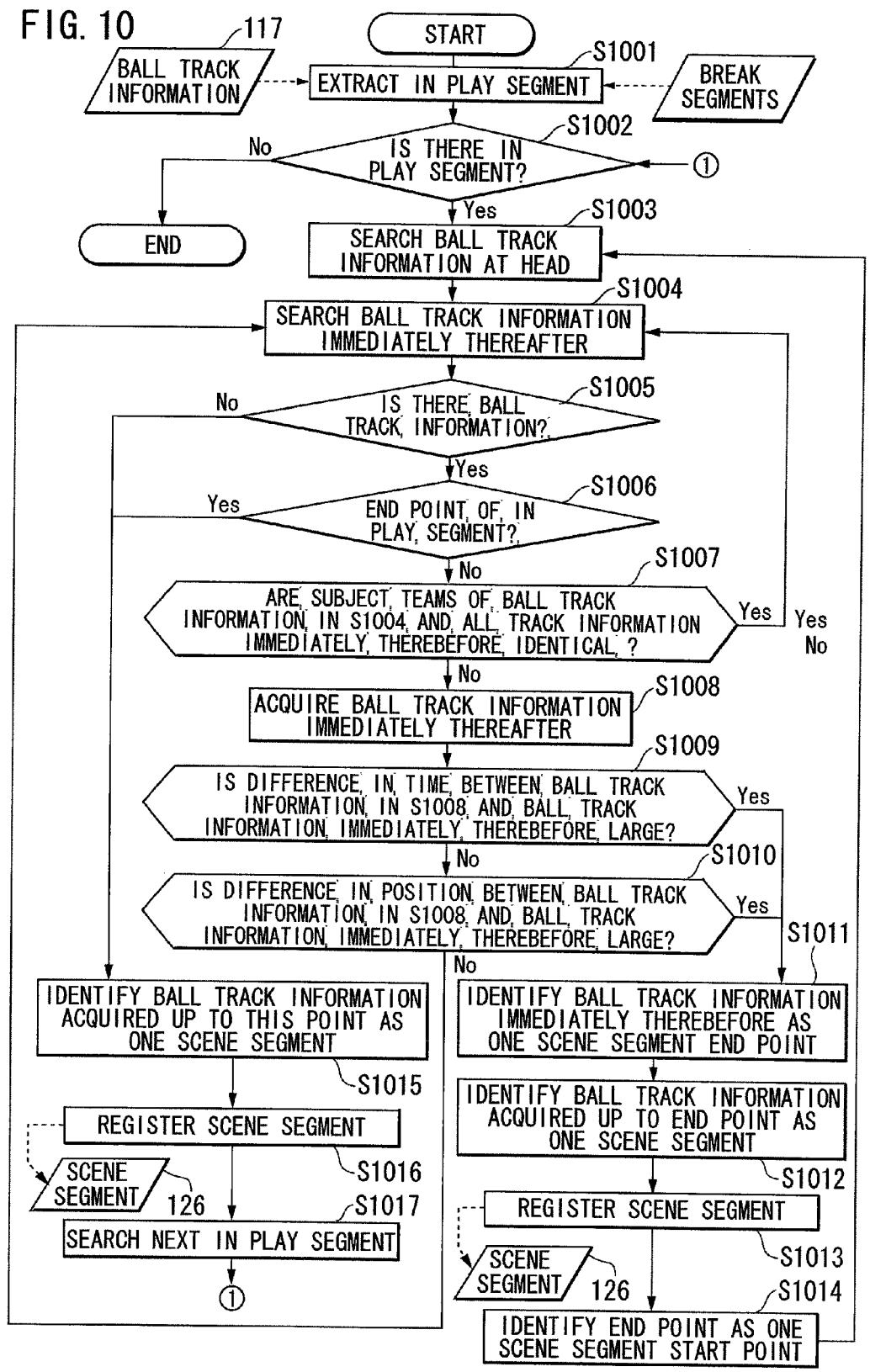
FIG. 10 is a flowchart showing a processing procedure performing scene segment division in an in play segment.

The processing procedure performing scene segment division in an in play segment will be described using FIG. 10. In step 1001, the offence and defense scene division unit 125 extracts an in play segment based on the ball track information in the ball track information storage unit 117 and the break segment in the break segment storage unit 124. In step 1002, when there is an in play segment, the routine is advanced to step 1003, and when not, the processing is ended. In step 1003, ball track information at the head of the extracted in play segment is acquired. In step 1004, ball track information immediately thereafter is acquired. In FIG. 11 or 12, the head of the extracted in play segment is the ball track information a, ball track information immediately thereafter is the ball track information b, and these are acquired. In step 1005, it is judged whether or not there is ball track information immediately thereafter. If yes, the routine is advanced to step 1006. If no, the routine is advanced to step 1015. In step 1006, whether or not the ball track information is the end point of the in play segment. If no, the routine is advanced to step 1007. If yes, the routine is advanced to step 1015. In FIG. 11 or 12, since the ball track information b is not the end point of the in play segment, the routine is advanced to step 1007. In step 1007, it is judged whether or not the subjects of the ball track information acquired in step 1004 and ball track information immediately therebefore belong to the same team. If yes, the routine is advanced to step 1004 to perform steps 1004 to 1007 again. If no, the routine is advanced to step 1008. In FIG. 11 or 12, the subject team of the ball track information b is A team. The subject team of the ball track information a immediately therebefore is A team. The subjects are identical. In this case, the routine is returned to step 1004 to perform steps 1004 to 1007 again. After acquiring the ball track information c in which the subject team is B team, the routine is advanced to step 1008.

In step 1008, ball track information immediately after the ball track information acquired in step 1004 is acquired. In FIG. 11 or 12, the ball track information d is acquired. In step 1009, the ball track information acquired in step 1008 is compared with the ball track information immediately therebefore, that is, the ball track information acquired in step 1004, to judge whether or not the difference in track change time is large. When the difference in time is large, the routine is advanced to step 1011. When the difference in time is small, the routine is advanced to step 1010. The judge reference can be optionally set. In this embodiment, the difference of 5 seconds or more is judged to be a large difference in track change time. In FIG. 11 or 12, the track change time of the ball track information c is 00:12:18, and the track change time of the ball track information d is 00:12:22. The difference in track change time is small. In this case, the routine is advanced to step 1010. When the track change time of the ball track information d is 00:12:28, the routine is advanced to step 1011. In step 1010, it is judged whether or not the difference in ball position between the ball track information acquired in step 1008 and the ball track information immediately therebefore is large. When the difference in position is large, the routine is advanced to step 1011. When the difference in position is small, the routine is returned to step 1004. The judge reference can be optionally set. In this embodiment, the difference of 400 or more on the X axis or the Y axis is judged to be a large difference in ball position. In FIG. 11, the ball position of the ball track information d is (200, 650), and the ball position of the ball track information c is (550, 150). The difference in position is large. In this case, the routine is advanced to step 1011. In FIG. 12, the ball position of the ball track information d is (500, 350), and the ball position of the ball track information c is (400, 150). The difference in position is small. In this case, the routine is returned to step 1004 to acquire the ball track information e immediately thereafter.

In step 1011, information immediately before the ball track information acquired in step 1008 is identified as a scene segment end point. In step 1012, the ball track information acquired up to the scene segment end point is managed as one scene segment. In step 1013, the scene segment is registered into the scene segment storage unit 126. In step 1014, the scene segment end point identified in step 1011 is identified as the next scene segment start point, that is, ball track information at the head of the next scene segment, to return to step 1003 for performing the processing again.

In step 1015, ball track information immediately thereafter is searched in step 1004. When there is not the ball track information or when the ball track information immediately thereafter is the end point of the in play segment, the ball track information acquired up to this point is one scene segment. When there is not ball track information, ball track information immediately therebefore is identified as a scene segment end point. When ball track information immediately thereafter is the end point of the in play segment, the information is identified as the scene segment end point. In FIG. 11 or 12, there is not ball track information immediately after the ball track information e. In this case, the ball track information e is identified as the scene segment end point. The ball track information e immediately after the ball track information d is the end point of the in play segment. In this case, the ball track information e is identified as the scene segment end point. The ball track information acquired up to the scene segment end point is managed as one scene segment. In step 1016, the scene segment is registered into the scene segment storage unit 126. In step 1017, the next in play segment is searched to return to step 1002. In step 1002, when there is the next in play segment, the routine is advanced to step 1003. When not, the processing is ended. In the above processing, the in play segment is extracted based on the ball track information in the ball track information storage unit 117 and the break segment in the break segment storage unit 124, and then, a series of offence scenes are divided as each scene segment to be managed.

The scene segment dividing device of this embodiment manages ball track information specifying a subject for each track change of a ball displayed in a photographed sports image, performs processing specifying a break segment based on the ball position, processing specifying a break segment based on the occurrence time of referee sign information, and processing extracting the point where the ball is stopped for a fixed time to specify a break segment, thereby acquiring the break segments, extracts an in play segment based on these, performs scene segment division processing in the in play segment, and can precisely manage a series of offenses as one scene segment when there are a confused fight state and a clear scene.

In this embodiment, a scene segment is precisely managed for each series of offenses based on track information of a ball displayed in a sports image. A break segment is specified to specify the contents of play immediately before break start or immediately after break end. This is associated with ball track information to be managed. The contents of play in an in play segment can be easily grasped.

For instance, when the ball track information and the field information in step 301 are used to specify the break segment outside the field, the contents of play immediately after the break segment end can be specified as a throw-in, goal kick, or corner kick. For instance, in FIG. 5, the ball position at the break end point is the position in which a throw-in is performed. The contents of play immediately after the break end point can be specified as a throw-in. The contents of play immediately after the break end point specified using the ball position include a goal kick and a corner kick. When the contents of play immediately after the break endpoint indicate a throw-in, the ball track information f is associated with the throw-in to be registered into the ball track information storage unit 117. The throw-in scene can be easily grasped (see FIG. 5).

When the ball track information inside the field in steps 302 and 303 is used to specify the break segment based on the point where the ball is stopped for a fixed time, the contents of play immediately after the break segment end can be specified as a free kick. In this case, the ball track information d' immediately after the break end point is associated with the free kick to be registered into the ball track information storage unit 117. The free kick scene can be easily grasped (see FIGS. 7 and 9).

In scene segment division in the in play segment in step 305, the contents of play at the end of the divided scene segment can be specified as clear. In this case, the ball track information c at the scene segment end is associated with the clear to be registered into the ball track information storage unit 117. The clear scene can be easily grasped (see FIG. 11). When scene segment division in an in play segment cannot be done in step 305, the in play segment can be specified as a confused fight state. In this case, the ball track information a at the head of the in play segment is associated with the confused fight state to be registered into the ball track information storage unit 117. The confused fight state can be easily grasped (see FIG. 12).

Field information or referee sign information is used to specify a goal scene based on the ball position of ball track information and a break segment after goal. For instance, the goal position can be grasped using field information ((400-600, 80-100) or (400-600, 900-920)). When there is referee sign information immediately after the ball position is moved to the position in the goal ((550, 90)), the presence of a goal scene can be specified at this point. In this case, ball track information at the point where there is the goal scene is associated with the goal to be registered into the ball track information storage unit 117. The contents of play in an in play segment can be easily grasped. Ball track information after goal is in a break segment and can be specified as the break segment until the ball position of the ball track information is moved to the centerline position ((500, 500)) and there is referee sign information.

The track change time of ball track information and referee sign information are used to associate a game start point and a game end point with the ball track information to be registered into the ball track information storage unit 117. Scenes immediately after the start of the game and immediately before the end of the game can be easily grasped.

Figure 25:
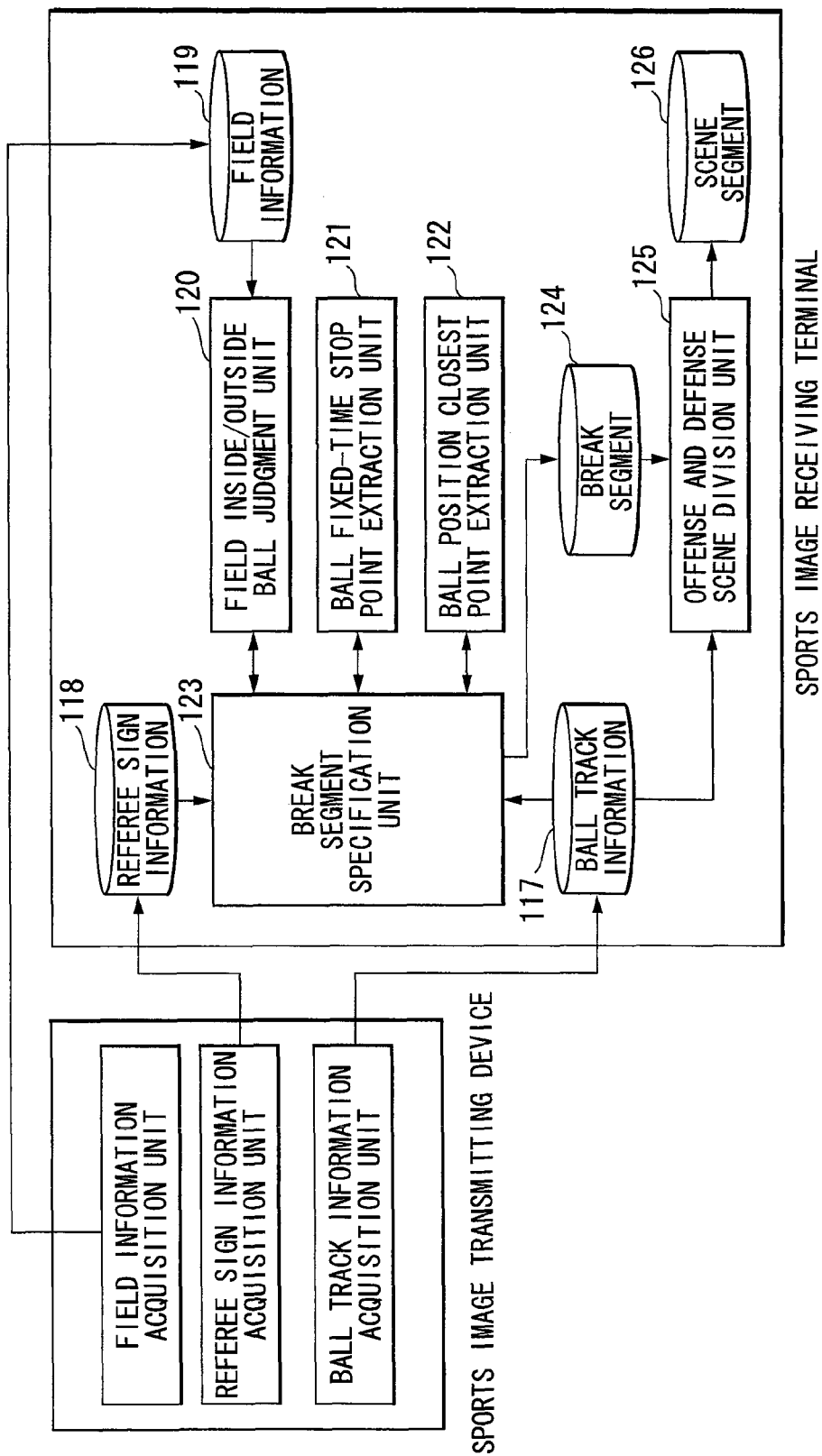
FIG. 25 is a diagram showing a sports image delivery system according to another embodiment.
Figure 26:
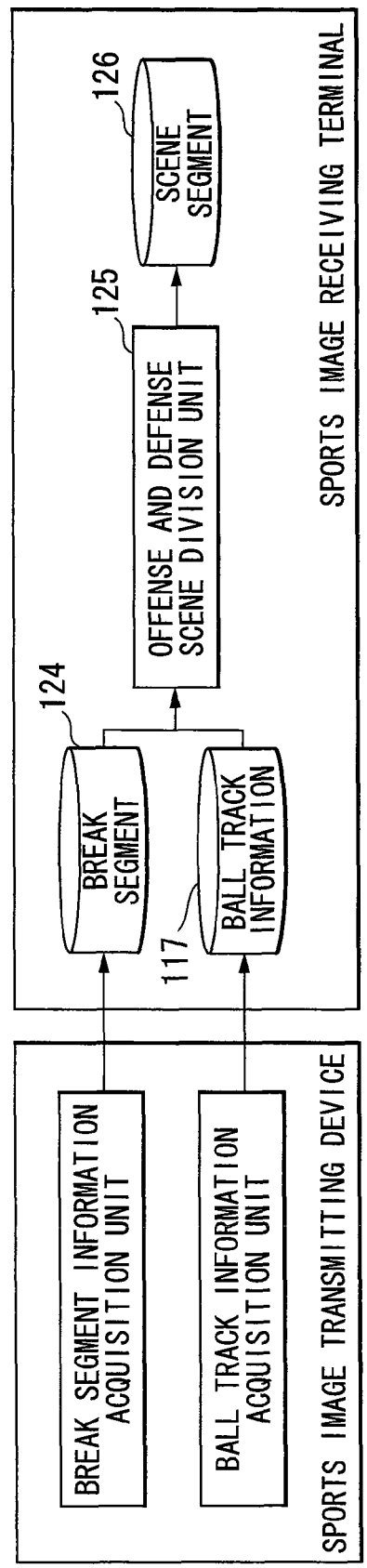
FIG. 26 is a diagram showing a sports image delivery system according to a further embodiment.

In this embodiment, as best mode, the sports image transmitting device divides and manages scene segments to deliver them to the sports image receiving terminal. Break segment specification and scene segment division may be performed by any one of the sports image transmitting device and the sports image receiving terminal. For instance, as shown in FIG. 25, the sports image transmitting device may transmit ball track information, field information, and referee sign information, and the sports image receiving terminal may use these to perform processing of break segment specification and scene segment division. As shown in FIG. 26, the sports image transmitting device may specify a break segment to transmit it with ball track information, and the sports image receiving terminal may use these to perform scene segment division processing.

The present invention is suitable for digest viewing sports images of succor. Only an in play segment can be viewed for a short time. Each scene desired by the user can be viewed.

What is claimed is:

1. A scene segment dividing device, comprising:
 a ball track information storage unit that manages ball track information specifying information of ball track change time, information of ball position, information of ball movement and a subject for each track change of a ball displayed in a sports image;
 a ball fixed-time stop point extraction unit that extracts the ball track information at a point where movement of the ball is stopped for a fixed time from the ball track information storage unit based on the information of ball track change time and the information of ball movement;
 a ball closest point extraction unit that extracts the ball track information at a point closest to the ball position specified by the ball track information at a time the ball is stopped for a fixed time from the ball track information storage based on the information of ball position;
 a break segment specification unit that acquires ball track information from the ball track information storage unit to specify break segments in which a game is stopped by specifying a break end time point based on the information of ball track change time obtained from the ball track information extracted by the ball fixed-time stop point extraction unit, and by specifying a break start time point based on the information of ball track change time obtained from the ball track information extracted by the ball closest point extraction unit; and
 a scene segment division unit that extracts ball track information in an in play segment in which the game is progressing from the ball track information storage unit based on the specified break segments and further, divides the in play segment into scene segments which includes a series of playing actions.

2. The scene segment dividing device according to claim 1, further comprising:
 a field information storage unit that manages a line of a field by coordinate information; and
 a field inside/outside judgment unit that uses the field information to judge whether or not the ball position is inside the field, wherein
 the break segment specification unit acquiring ball track information from the ball track information storage unit and using the ball track information to specify, as a break segment, ball track information outside the field judged by the field inside/outside judgment unit.

3. The scene segment dividing device according to claim 1, further comprising a referee sign information storage unit that manages referee sign time, the break segment specification unit using the ball track information and the referee sign information to specify a break segment.

4. The scene segment dividing device according to claim 1, further comprising:
 a break segment specification unit that uses the ball position of the ball track information and field information managing a line of a field by coordinate information to specify a break segment outside the field; and
 a break segment specification unit that uses the ball track change time of the ball track information and referee sign information managing referee sign time to specify a break segment.

5. The scene segment dividing device according to claim 4, wherein the break segment specification unit that uses the ball position of the ball track information and field information managing a line of a field by coordinate information to specify a break segment outside the field executes the processes of:
 acquiring first ball track information;
 using the field information to judge whether or not the ball position of the first ball track information is inside the field;
 acquiring second ball track information immediately thereafter when the first ball track information is inside the field;
 using the field information to identify the second ball track information as a break start point when the ball position of the second ball track information is outside the field, thereby acquiring the information;
 acquiring third ball track information immediately thereafter when the first ball track information is outside the field; and
 using the field information to identify the third ball track information as a break end point when the ball position of the third ball track information is inside the field, thereby acquiring the information.

6. The scene segment dividing device according to claim 4, wherein the break segment specification unit that uses the ball track change time of the ball track information and referee sign information managing referee sign time to specify a break segment executes the processes of:
 acquiring the referee sign information;
 acquiring plural pieces of ball track information within a fixed time immediately after the referee sign time of the referee sign information and identifying first ball track information at the head as a break start point;
 judging whether or not there is, in the plural pieces of acquired ball track information, second ball track information in which the ball is stopped for a fixed time;

when there is the second ball track information in which the ball is stopped for a fixed time, identifying the ball track information as a break end point and acquiring the information;

when there is not the second ball track information in which the ball is stopped for a fixed time, acquiring third ball track information immediately before the referee sign time; and identifying, as the break end point, fourth ball track information closest to the ball position of the third ball track information of the plural pieces of acquired ball track information and acquiring the information.

7. The scene segment dividing device according to claim 4, further comprising:

a break segment specification unit that uses a ball movement vector and the ball position of the ball track information to specify a break segment;

wherein the break segment specification unit executes the processes of:

acquiring first ball track information in which movement of the ball is stopped for a fixed time and identifying the information as a break end point;

acquiring plural pieces of ball track information within a fixed time immediately before the first ball track information; and identifying, as a break start point, second ball track information immediately after ball track information closest to the ball position of the first ball track information of the plural pieces of acquired ball track information and acquiring the information.

8. The scene segment dividing device according to claim 4, wherein the scene segment division unit executes the processes of:

acquiring first ball track information at the head in the in play segment;

acquiring second ball track information immediately thereafter;

when the second ball track information is the end point of the in play segment and the subject of the second ball track information is different from the subject of the first ball track information, acquiring third ball track information immediately thereafter;

when a difference in time or a difference in position between the second ball track information and the third ball track information is large, identifying the second ball track information as a scene segment end point; and acquiring the ball track information acquired up to the scene segment end point as one scene segment.

\* \* \* \* \*